United States Patent [19]
Nakagawa

[11] Patent Number: 5,637,327
[45] Date of Patent: Jun. 10, 1997

[54] MOLD WITH RECESS FOR CONVEX INSERT PORTION

[75] Inventor: Yuji Nakagawa, Tsu, Japan

[73] Assignee: Sumitomo Bakelite Company Limited, Tokyo, Japan

[21] Appl. No.: 386,543

[22] Filed: Feb. 10, 1995

[30] Foreign Application Priority Data

Feb. 16, 1994 [JP] Japan ..................... 6-019048

[51] Int. Cl.$^6$ ............. B29C 45/16; B29C 45/36; B29C 45/44
[52] U.S. Cl. ............. 425/116; 425/117; 425/577; 425/441; 425/443; 249/93; 249/94; 249/95
[58] Field of Search ................. 465/116, 117, 465/577, 443, 441, DIG. 58; 249/93, 94, 95

[56] References Cited

U.S. PATENT DOCUMENTS

| | | |
|---|---|---|
| 3,970,488 | 7/1976 | Nelson ..................... 249/95 |
| 4,255,111 | 3/1981 | Suzuki ..................... 425/43 |
| 4,372,524 | 2/1983 | Pailler ..................... 249/95 |
| 5,073,326 | 12/1991 | Craves et al. |

FOREIGN PATENT DOCUMENTS

| | | |
|---|---|---|
| 2 662 113 A1 | 11/1991 | France . |
| 2 046 227 | 11/1980 | United Kingdom . |
| 2 145 364 | 3/1985 | United Kingdom . |

*Primary Examiner*—Khanh P. Nguyen
*Attorney, Agent, or Firm*—Browdy and Neimark

[57] ABSTRACT

There is disclosed a mold for molding a box-shaped product which is open at one side face thereof, and has a resilient insert extending into an interior of the product through a side face of the product opposite to the opening. The insert has a convex portion formed on one surface thereof. A mold cavity is defined by a pair of metal mold halves and a pair of slide cores. The mold halves form an outer shape of the product, and the slide cores form an inner shape of the product. One of the slide cores has a recess for receiving the convex portion of the insert. In the molding, after a resin is cured, the other slide core is retracted before the metal mold halves are opened apart from each other, and then the one slide core with the recess is retracted.

14 Claims, 3 Drawing Sheets

MOLD WITH RECESS FOR CONVEX INSERT PORTION

FIELD OF THE INVENTION AND RELATED ART STATEMENT

This invention relates to a mold for molding a box-shaped product having an insert, and more particularly to a mold for molding a product having an insert having an undercut configuration with respect to a slide core of the mold. The invention also relates to a method of molding a product by the use of such a mold.

In one conventional mold for molding a product having an insert, a recess for holding the insert is formed in one of mold halves, and in another conventional mold, an insert is adapted to be held between mold halves. In the latter, in case that the molded product is a box-shaped one with an opening, in which the insert extends into an interior of the molded product through a side face thereof opposite to the opening, it is a common practice to use a slide core for forming an inner shape of the molded product.

However, in case that the insert further has a convex portion, this convex portion has an undercut configuration with respect to the slide core, and therefore the slide core can not be used. Therefore, there must be adopted a method in which a mold part (piece), having a recess corresponding to the convex portion, is incorporated into the mold by the hand, and the molded product is taken out together with the piece after the molding is completed, and then the piece is removed by the hand. Therefore, it has been difficult to practically use this method in a manner to achieve good productivity.

OBJECT AND SUMMARY OF THE INVENTION

It is an object of this invention to provide a mold of the slide core-type for molding a product having an insert having an undercut configuration with respect to a slide core, without extensively changing a conventional mold construction.

Another object of the invention is to provide a method of molding such a product.

To this end, according to one aspect of the present invention, there is provided a mold for molding a box-shaped product which is open at one side face thereof, and has a resilient insert extending into an interior of the product through a side face of the product opposite to the opening, which insert has a convex portion formed on one surface thereof parallel to a direction of extending of the insert, the mold comprising:

- a pair of metal mold halves for cooperating with each other to form an outer shape of the product, the mold halves being movable close to and away from each other in one direction;
- a pair of slide core halves for cooperating with each other to form an inner shape of the product, the slide core halves being movable relative to each other in a direction perpendicular to the one direction, and one of the slide core halves having a recess for receiving the convex portion of the insert;
- a cavity being defined by the metal mold halves and the slide core halves; and
- a gate communicated with the cavity.

According to another aspect of the invention, there is provided a method of molding a box-shaped product which is open at one side face thereof, and has a resilient insert extending into an interior of the molded product through a side face of the product opposite to the opening, which insert having a convex portion formed on one surface thereof parallel to a direction of extending of the insert, the method comprising the steps of:

(a) providing a pair of metal mold halves and a pair of slide core halves one of which has a recess for receiving the convex portion;

(b) forming one mold structure half by means of one of the metal mold halves and the one slide core half with the recess to thereby define one half of a mold cavity, and forming the other mold structure half by means of the other metal mold half and the other slide core half to thereby define the other half of the mold cavity;

(c) setting the insert on one of the mold structure halves;

(d) clamping the other mold structure half to the one mold structure half to define a whole of the mold cavity;

(e) pouring a resin into the whole of the mold cavity through a gate;

(f) curing or setting the resin;

(g) removing the other slide core half from the other mold structure half in a direction perpendicular to a mold clamping direction; and (h) removing the one slide core half from the one mold structure half in a direction perpendicular to the mold clamping direction while resiliently deforming the insert.

DETAILED DESCRIPTION OF THE PREFERRED EMBODIMENTS

Figure 1:
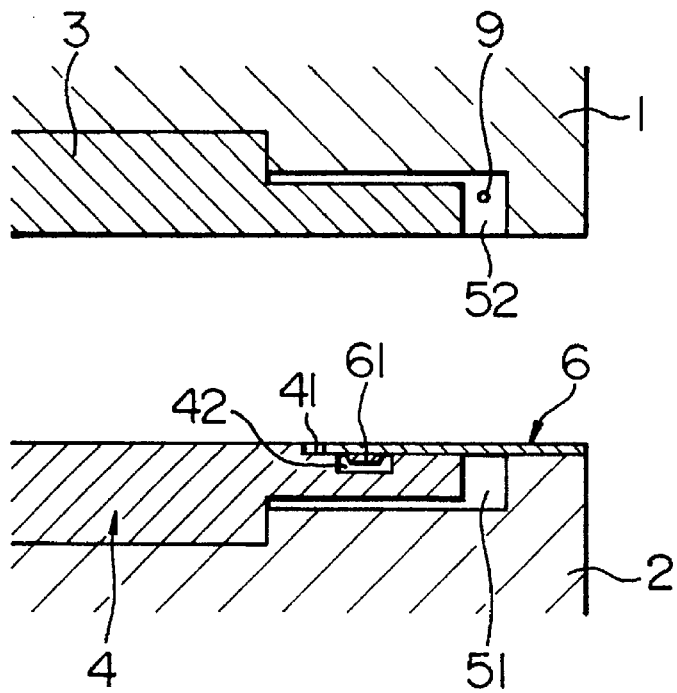
FIG. 1 is a cross-sectional view showing the construction of a mold of the present invention.
Figure 6:
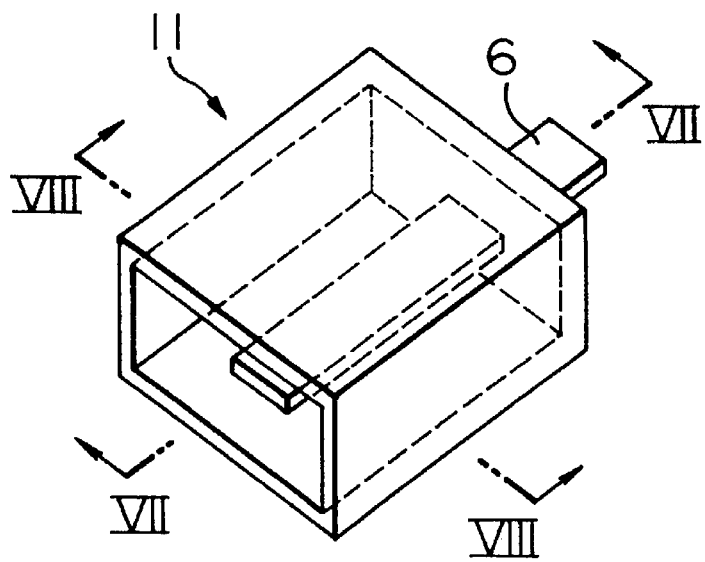
FIG. 6 is a perspective view of the product molded by the mold of the invention.
Figure 7:
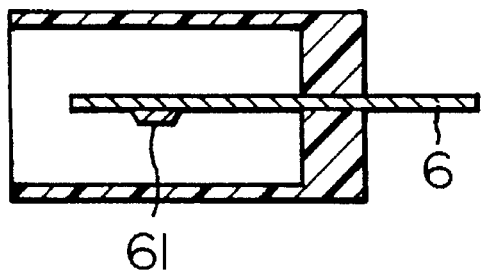
FIG. 7 is a cross-sectional view taken along the line VII—VII of FIG. 6.
Figure 8:
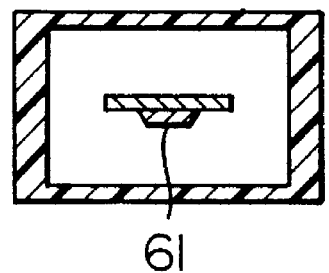
FIG. 8 is a cross-sectional view taken along the line VIII—VIII of FIG. 6.

A preferred embodiment of a mold of the present invention comprises a pair of metal mold halves 1 and 2, and a pair of slide core halves 3 and 4, as shown in FIG. 1. For the sake of description, the metal mold half 1 and the slide core half 3 will hereinafter be referred to as "upper metal mold" and "upper slide core", respectively, while the metal mold half 2 and the slide core half 4 will hereinafter be referred to as "lower metal mold" and "lower slide core", respectively. This mold is suited for molding a box-shaped product 11 shown in FIGS. 6–8, which is open at one side face thereof, and has an insert 6 of an undercut configuration. The term "box-shape" means not only a box of a rectangular cross-section as illustrated, but also those having a circular cross-section, a polygonal cross-section and so on.

The lower slide core 4 is slidable relative to the lower metal mold 2, and the two cooperate with each other to define a lower mold cavity 51 therebetween.

The upper slide core 3 is slidable relative to the upper metal mold 1, and the two cooperate with each other to define an upper mold cavity 52 therebetween. The upper slide core 3 is also slidable relative to the lower slide core 4. Except for the upper mold cavity 52, the upper metal mold 1 is flush with the upper slide core 3. A gate 9 in communication with the upper mold cavity 52 is formed in the upper metal mold 1.

The insert 6 is an elongate, plate-like member of metal, and has flexibility or resiliency. A convex portion 61 is formed on one side of the insert 6, and the other side of the insert 6 is flat. Namely, the insert 6 has an undercut configuration with respect to the lower slide core 4. An elongate groove 41 is formed in an upper surface of the lower slide core 4, and when the insert 6 is placed on the lower slide core 4, this groove 41 receives the insert 6 in such a manner that the insert 6 lies flush with the remainder of the upper surface of the lower slide core 4. A recess 42 for receiving the convex portion 61 is formed in a bottom surface of the groove 41. The insert 6 is placed on the lower slide core 4 and the lower metal mold 2 in such a manner that the insert 6 is disposed flush with the lower slide core 4, with the convex portion 61 received in the recess 42. The insert 6 is positioned relative to the lower metal mold 2 by respectively fitting a plurality of holes, formed in the insert 6, on corresponding projections formed on the lower metal mold 2.

Then, the upper and lower mold structures are clamped together in such a manner that one end portion of the insert 6 remote from the convex portion 61 is held therebetween. At this time, a whole cavity 5 (FIG. 2) is formed by the lower mold cavity 51 and the upper mold cavity 52.

Figure 2:
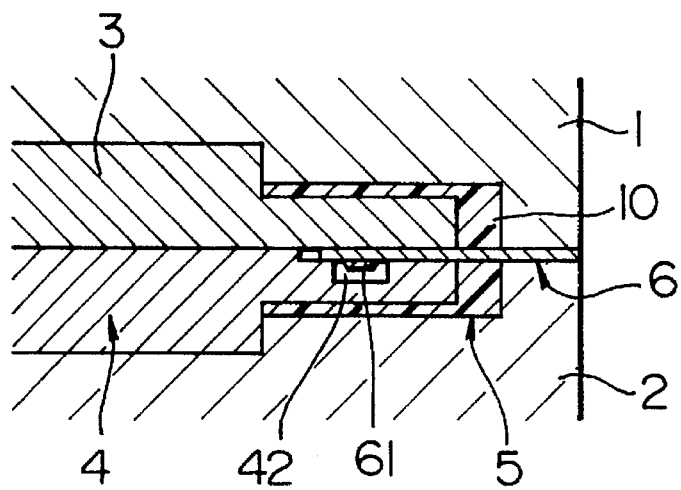
FIG. 2 is a cross-sectional view showing a condition in which the mold is clamped, and a resin is poured into the mold.

A resin 10 is injected into the whole cavity 5 through the gate 9, as shown in FIG. 2. Although it is preferred that the gate 9 be located at a position corresponding to a side wall of the product which is remote from the opening of the product, as shown in FIG. 1, the gate is not limited to this position.

Figure 3:
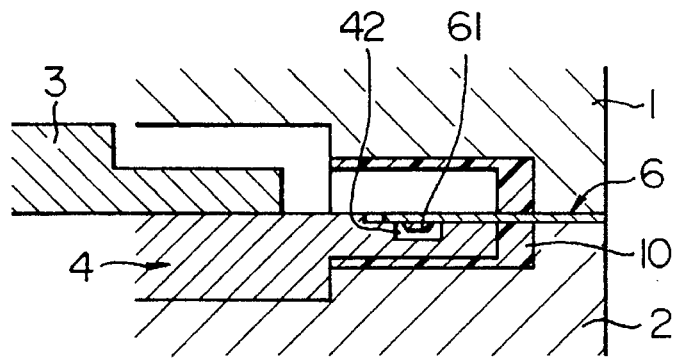
FIG. 3 is a cross-sectional view showing a condition in which an upper slide core is being retracted after the resin is cured.
Figure 4:
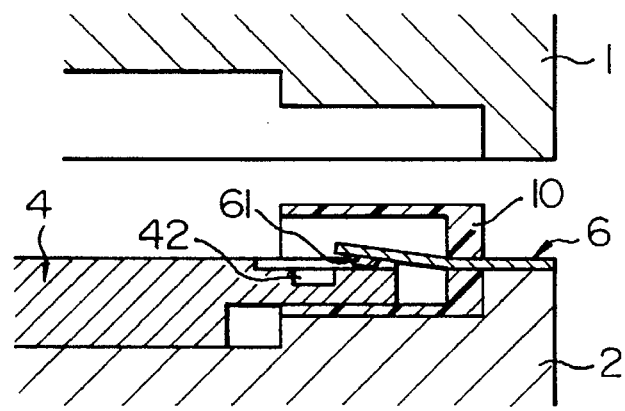
FIG. 4 is a cross-sectional view showing a condition in which the mold is opened, and a lower slide core is retracted.

After the resin 10 is cured or set, the upper slide core 3 is at first slidingly withdrawn from the mold as shown in FIG. 3. Then, the upper mold 1 is opened, and then the lower slide core 4 is withdrawn as shown in FIG. 4. At this time, because of the resiliency of the insert 6, it is flexed or bent to allow the withdrawal of the lower slide core 4 when the convex portion 61 of the insert 6 is disengaged from the recess 42 in the lower slide core 4. Preferably, in order to smoothly withdraw the lower slide core 4, the recess 42 is of such a configuration that its side wall surfaces are slanting, that is, its opening is flared. The lower slide core 4 may be withdrawn before the upper metal mold 1 is opened. As is clear from the foregoing description, before the slide core, having the recess for receiving the convex portion of the insert 6, is withdrawn, the other slide core is needed to be withdrawn. It is not important whether the convex portion is formed on either side (face) of the insert 6.

Figure 5:
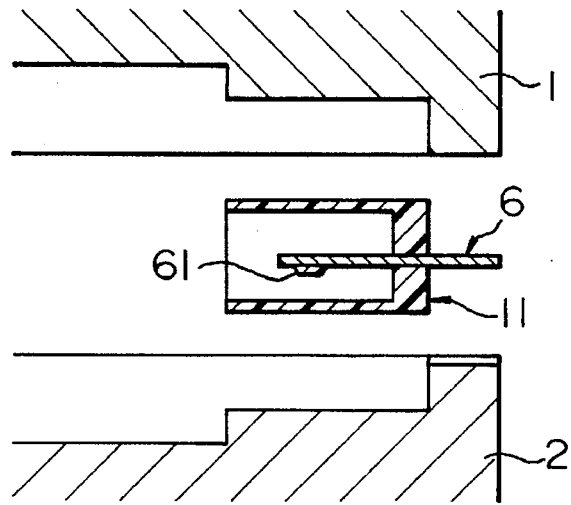
FIG. 5 is a cross-sectional view showing a condition in which a product molded by the mold of the invention is ejected.

Finally, the molded product 11 is removed from the lower metal mold 2 by an ejection pin (not shown), as shown in FIG. 5.

The above process is repeated, thereby continuously molding the products.

What is claimed is:

1. A mold for molding a box-shaped product which is open at one side face thereof, and has a preformed resilient insert extending into an interior of the product through a side face of the product opposite to said opening, which insert has a convex portion formed on one surface thereof parallel to a direction of extending of the insert, said mold comprising:

a pair of metal mold halves for cooperating with each other to form an outer shape of the product, said mold halves being movable close to and away from each other in one direction;

a pair of slide core halves for cooperating with each other to form an inner shape of the product, said slide core halves being movable relative to each other in a direction perpendicular to said one direction, and one of said slide core halves including recess means for receiving the convex portion of the insert which is interposed between said slide core halves;

a cavity being defined by said metal mold halves and said slide core halves; and a gate communicated with said cavity.

2. A mold according to claim 1, in which a resin is poured into said cavity through said gate.

3. A mold according to claim 2, in which a portion of said insert to be exposed from the product is held between said pair of metal mold halves.

4. The mold according to claim 1, wherein the mold includes means for the insert to be in flush contact with both the slide core halves when interposed between the slide core halves.

5. The mold according to claim 1, wherein both of the slide core halves are movable along the direction perpendicular to the one direction in a same sense of motion and including means for withdrawing the both of the slide core halves from the one side face, whereby the slide core halves are withdrawable from the box-shaped product after the product is formed by resin poured into the cavity through the gate.

6. The mold according to claim 5, wherein the means for withdrawing the both of the slide core halves includes means for withdrawing the one of the slide core halves after an other one of the slide core halves is withdrawn.

7. The mold according to claim 5, wherein the slide core halves include faces in slidable mutual contact when the mold halves are moved close to each other in the one direction.

8. The mold according to claim 7, wherein at least one of the slide core halves includes an elongate groove means for holding the insert therein to be flush with a respective one of the faces.

9. The mold according to claim 8, wherein the respective one of the faces is flat.

10. The mold according to claim 1, wherein an other one of said slide core halves has no recess.

11. The mold according to claim 1, wherein the direction perpendicular to said one direction is parallel to the one surface, whereby the recess means extends into the one of said slide core halves perpendicularly to the direction perpendicular to said one direction.

12. The mold according to claim 1, wherein sides of the recess means are slanted.

13. The mold according to claim 1, wherein the recess means is separated from the cavity by the slide core halves when the insert is interposed therebetween.

14. A mold for molding a box-shaped product which is open at one side face thereof, and has a preformed resilient insert extending into an interior of the product through a side face of the product opposite to said opening, which insert has a convex portion formed on one surface thereof parallel to a direction of extending of the insert, said mold comprising:

a pair of metal mold halves for cooperating with each other to form an outer shape of the product, said mold halves being movable close to and away from each other in one direction;

a pair of slide core halves for cooperating with each other to form an inner shape of the product, said slide core halves being movable relative to each other in a direction perpendicular to said one direction, and having walls which define therebetween (1) a space constituting means for retaining the preformed resilient insert, said space extending in said one direction and (2) a recess constituting means for receiving the convex portion of the insert which is interposed between said walls of said slide core halves, said recess constituting means extending in a direction perpendicular to said one direction;

a cavity being defined by said metal mold halves and said slide core halves, said cavity constituting means for receiving molten material to form said box-shaped product with said preformed resilient insert being captured by a wall of said product; and a gate communicated with said cavity.

* * * * *